United States Patent
Srinivasan et al.

(10) Patent No.: US 9,818,442 B2
(45) Date of Patent: Nov. 14, 2017

(54) MAGNETIC MEDIA HAVING IMPROVED MAGNETIC GRAIN SIZE DISTRIBUTION AND INTERGRANULAR SEGREGATION

(71) Applicant: WD Media, LLC, San Jose, CA (US)

(72) Inventors: Kumar Srinivasan, San Mateo, CA (US); Tuqiang Li, San Jose, CA (US); Mrugesh Desai, San Jose, CA (US)

(73) Assignee: WD MEDIA, LLC, San Jose, CA (US)

( * ) Notice: Subject to any disclaimer, the term of this patent is extended or adjusted under 35 U.S.C. 154(b) by 261 days.

(21) Appl. No.: 14/556,993

(22) Filed: Dec. 1, 2014

(65) Prior Publication Data

US 2016/0155460 A1 Jun. 2, 2016

(51) Int. Cl.
G11B 5/66 (2006.01)
G11B 5/73 (2006.01)

(52) U.S. Cl.
CPC .................................. *G11B 5/7325* (2013.01)

(58) Field of Classification Search
CPC ........ G11B 5/732; G11B 5/7325; G11B 5/738
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |

(Continued)

OTHER PUBLICATIONS

Kumar Srinivasan, et al., U.S. Appl. No. 14/497,299, filed Sep. 25, 2014, 37 pages.

(Continued)

*Primary Examiner* — Holly Rickman
(74) *Attorney, Agent, or Firm* — Foley & Lardner LLP

(57) ABSTRACT

A method and system provide a magnetic recording media usable in a magnetic storage device. The magnetic recording media includes a substrate, at least one intermediate layer and a magnetic recording stack for storing magnetic data. The intermediate layer(s) include a majority phase having a first diffusion constant and a secondary phase having a second diffusion constant greater than the first diffusion constant. The magnetic recording stack residing on the intermediate layer such that the at least one intermediate layer is between the substrate and the magnetic recording stack.

19 Claims, 4 Drawing Sheets

170'

| High Pressure Opt'lly 2-Phase Ru-Alloy Layer 176 |
|---|
| Low Pressure Opt'lly 2-phase Ru-Alloy Layer 174 |
| 2-phase RuCo Alloy Layer 172' |

(56) References Cited

U.S. PATENT DOCUMENTS

| | | |
|---|---|---|
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,089,829 B2 | 1/2012 | Akagi et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,390,956 B2 | 3/2013 | Tonooka et al. |

(56) References Cited

U.S. PATENT DOCUMENTS

| | | |
|---|---|---|
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,060 B2 | 11/2013 | Tamai et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,685,547 B2 | 4/2014 | Bian et al. |
| 8,696,404 B2 | 4/2014 | Sun et al. |
| 8,696,874 B2 | 4/2014 | Wang et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B2 | 8/2014 | Moser et al. |
| 2002/0060883 A1 | 5/2002 | Suzuki |
| 2003/0022024 A1 | 1/2003 | Wachenschwanz |
| 2003/0219630 A1* | 11/2003 | Moriwaki ............ G11B 5/656 428/836.2 |
| 2004/0022387 A1 | 2/2004 | Weikle |
| 2004/0047758 A1 | 3/2004 | Olson et al. |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0131735 A1 | 6/2008 | Das et al. |
| 2009/0117408 A1 | 5/2009 | Umezawa et al. |
| 2009/0130346 A1 | 5/2009 | Osawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0151280 A1* | 6/2011 | Takahashi ............ G11B 5/732 428/831.2 |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1* | 3/2013 | Srinivasan ............ C23C 14/025 428/831 |
| 2013/0165029 A1 | 6/2013 | Sun et al. |
| 2013/0175252 A1 | 7/2013 | Bourez |

(56) References Cited

U.S. PATENT DOCUMENTS

| | | |
|---|---|---|
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Brown, A.M., "Correlations for Diffusion Constants," Acta Metallurgica, vol. 28, Jan. 1980, pp. 1085-1101.

MSE 201, Introduction to Materials Science, Diffusion, Callister, Ch. 5, University of Tennessee, Dept. of Materials Science and Engineering, pp. 1-26.

\* cited by examiner

150'

| Overcoat Layer 159 |
| --- |
| Magnetic Recording Stack 154 |
| Intermed. Layer(s) w/ Multi-Phase Layer(s)  160 |
| Orientation Control Layer 158 |
| Antiferromagnetically Coupled Soft Underlayer 156 |
| Opt'l Adhesion Layer 155 |
| Substrate (e.g. AlMg) 152 |

160'

| High Pressure 2-Phase Ru-Alloy Layer 164 |
| --- |
| Low Pressure Ru Layer 162 |

US 9,818,442 B2

MAGNETIC MEDIA HAVING IMPROVED MAGNETIC GRAIN SIZE DISTRIBUTION AND INTERGRANULAR SEGREGATION

BACKGROUND

Conventional magnetic recording disk drives include a slider attached to a suspension and a media such as a disk. The slider typically includes a magnetic read transducer (reader) and a magnetic write transducer (writer). The writer magnetically records data as bits along a tracks in the media. The reader reads data back from the media.

The trend in magnetic recording is to higher areal densities. For example, densities of up to 1 Tbit/in$^2$ and higher are desired. To read, write and store data at such areal densities, the reader, writer, and media have evolved. For example, tunneling magnetoresistance (TMR) sensors may be used to read higher density media with sufficiently high signals. Perpendicular magnetic recording (PMR) writers and heat assisted magnetic recording (HAMR) writers, which utilize laser light to heat regions of the media to temperatures near and/or above the Curie temperature of the media, may be used to write to such high density media. Similarly, magnetic media have been developed to store data at higher areal densities.

Although such conventional magnetic recording disk drives function, there are drawbacks. For example, for high areal densities reduced noise, improved signal to noise ratio, and mechanisms to address other issues may be desired. Media that may be capable of providing these features are desired. Accordingly, what is needed is a system and method for improving the performance of a magnetic recording disk drive at higher areal densities.

DETAILED DESCRIPTION OF THE PREFERRED EMBODIMENTS

Figure 1:
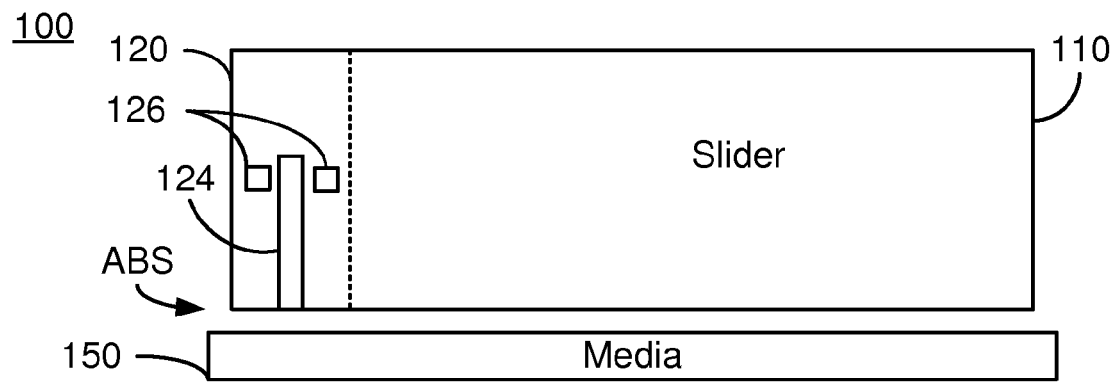
FIG. 1 depicts a side view of a magnetic recording apparatus, such as a disk drive.

FIG. 1 depicts a side view of an exemplary embodiment of a portion of a magnetic recording apparatus 100. In the embodiment shown, the apparatus 100 is a disk drive 100. For clarity, FIG. 1 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. The disk drive 100 may be a PMR disk drive, a HAMR disk drive or another type of disk drive. For simplicity, only single components 102, 110, 120 and 150 are shown. However, multiples of each components 102, 110, 120, and/or 150 and their sub-components, might be used.

The disk drive 100 includes a slider 110, a transducer 120 and media 150. Additional and/or different components may be included in the disk drive 100. For example, if the write transducer 120 is a HAMR writer, a laser might be included on or affixed to the slider 110. Although not shown, the slider 110, and thus the laser assembly 130 and transducer 120 are generally attached to a suspension (not shown).

The transducer 120 is fabricated on the slider 110 and includes an air-bearing surface (ABS) proximate to the media 150 during use. In general, the transducer 120 includes a write transducer and a read transducer. However, for clarity, only the write portion of the writer 120 is shown. The write transducer 120 includes a write pole 124 and coil(s) 126. The media 150 is configured to be usable at higher recording densities and, in some embodiments, to be used in the disk drive 100. In some embodiments, the media 150 is configured to store data with an areal density of at least 0.8 Tbit/in$^2$. In some such embodiment, the media 150 may store data having an areal density of 1 Tbit/in$^2$ or more.

Figure 2:
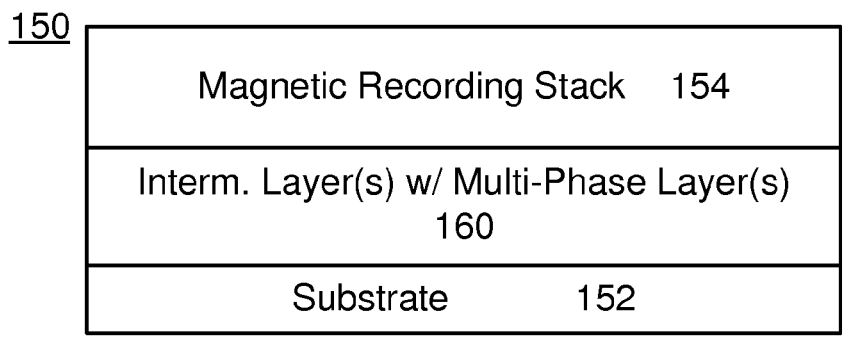
FIG. 2 depicts an exemplary embodiment of a magnetic recording media that may be usable in a magnetic recording apparatus.

FIG. 2 depicts an exemplary embodiment of the magnetic media 150 usable in a disk drive such as the disk drive 100. For clarity, FIG. 2 is not to scale. A substrate 152 on which the magnetic recording media 150 is fabricated is also shown. Referring to FIGS. 1-2, the magnetic recording media includes a magnetic recording stack 154 and at least one intermediate layer 160 between the magnetic recording stack 154 and the substrate. For simplicity not all portions of the magnetic recording media are shown. Other and/or additional layers may be present. For example, although not shown in FIG. 2, an overcoat layer is generally used. The overcoat layer would reside on the magnetic recording stack 154 and between the magnetic recording stack 154 and the slider 110. Other layer(s) may also reside between the layers 152 and 160. However, the relationships between the layers 152, 154 and 160 may be preserved. Stated differently, the multiple phase intermediate layer(s) 160 are between the substrate 152 and the magnetic recording stack.

The magnetic recording stack 154 stores magnetic data. The magnetic recording stack 154 is on the intermediate layer(s) 160 such that the intermediate layer(s) are between the substrate 152 and the magnetic recording stack 156. In some embodiments, the magnetic recording stack 154 includes multiple layers. For example, the magnetic recording stack 154 may include including exchange-control layers or exchange-break layers as well as magnetic layer(s) in which data are stored.

The intermediate layer(s) 160 include one or more layers. At least one of these layers is a multi-phase layer. The multi-phase layer is an alloy layer having multiple phases. The multiple phases include a majority phase and a secondary phase. Additional phases might be present. The majority phase has a first diffusion constant. The secondary phase has a second diffusion constant greater than the first diffusion constant. Thus, it is believed that the secondary phase segregates to the grain boundaries of the multi-phase layer.

The majority phase has a first crystal structure, a first orientation, and a first composition. The secondary phase is a precipitate that segregates out of the majority. The secondary phase may have a second composition different from the first composition of the majority phase. The crystal structure and orientation of the secondary phase may be different from or the same as that of the majority phase. The first orientation and the first crystal structure of the majority phase are substantially unchanged by the secondary phase. For example, in the Ru layers described below, the majority phase of the layer may remain with a hexagonal close packed (HCP) crystal structure and the desired orientation despite the presence of the secondary phase. In some embodiments, this secondary phase is a eutectic phase.

The multi-phase layers may be considered to be formed by a primary material, or constituent, and at least one additional material that alloy to form the majority and secondary phases described above. The primary material may be an element or an alloy. Additional material(s) may be added in order to form the multiphase layer. The additional material(s) have limited solubility in the primary material(s) and form the secondary (e.g. eutectic) phase with the primary material(s) over a particular concentration range.

Figure 3A:
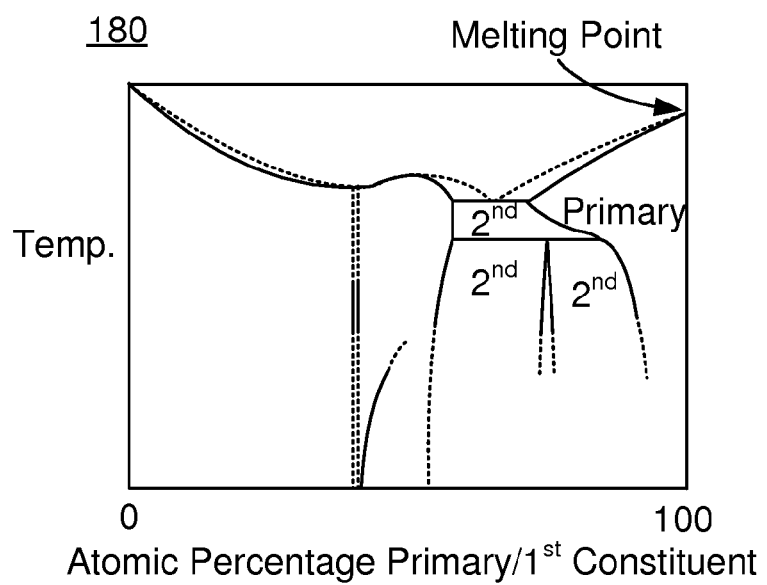
FIGS. 3A and 3B are alloy diagrams depicting the phases of an alloy in another exemplary embodiment of an intermediate layer for a magnetic recording media.
Figures 3B, 4, 5:
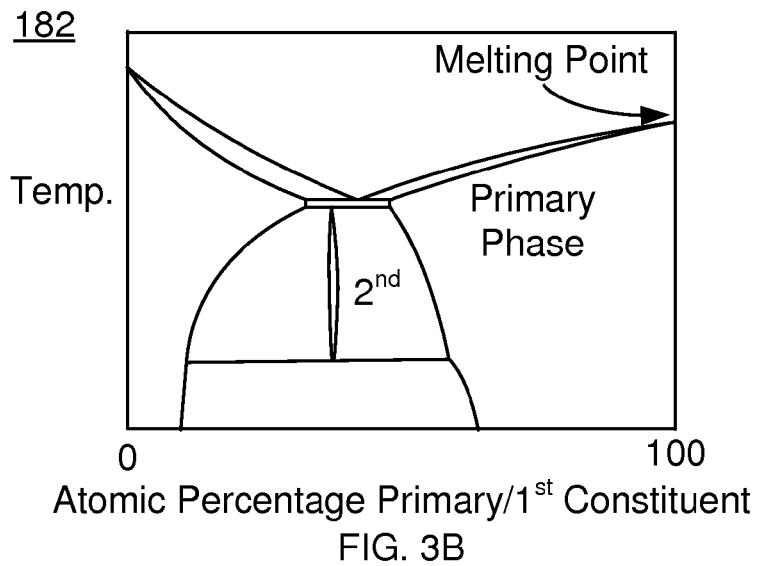
FIG. 4 depicts another exemplary embodiment of a magnetic recording media that may be usable in a magnetic recording apparatus.
FIG. 5 depicts another exemplary embodiment of an intermediate layer for a magnetic recording media.

Composition of the alloy(s) used in the multi-phase layers may understood with reference to FIGS. 3A and 3B. Referring to FIGS. 2-3B, FIGS. 3A and 3B are alloy diagrams for two alloys that exhibit multi-phase behavior. FIG. 3A depicts an alloy diagram 180 for a first alloy, while FIG. 3B depicts and alloy diagram 180' for a second alloy. The alloys include a primary material, or primary constituent. In the alloy diagrams 180, the atomic percentage of the primary constituent is along the horizontal axis and the temperature is along the vertical axis. As can be seen in the diagrams 180 and 180', for an alloy formed purely of the primary constituent (100 atomic percent primary constituent), only the majority phase is present below the melting point. This region is labeled "Primary" in the diagrams 180 and 180'. Only the majority phase continues to be present for larger percentages of the primary constituent that are less than one hundred percent. As the fraction of the primary constituent is reduced, corresponding larger amounts of an additional material having limited solubility in the primary constituent are present. Thus, the secondary phase is becomes present (labeled $2^{nd}$ in FIGS. 3A and 3B). For alloys in this concentration range, the secondary phase may precipitate out of the primary phase and segregate to the grain boundaries. For even lower concentrations of the primary constituent(s), the alloys may have other phases. Thus, the multi-phase layer(s) that are part of the intermediate layer 160 may be configured to have the additional material(s) in a concentration range that allows for the primary and secondary phases to be present. Using alloy diagrams analogous to those shown in FIGS. 3A-3B, material(s) that may be usable in the multi-phase layer may be selected.

For example, the multi-phase layer(s) in the intermediate layer(s) 160 may include an alloy that contains Ru. A multi-phase Ru-containing layer may include Ru and Co. In such a multi-phase RuCo layer, the Ru and Co may be alloyed with one or more other materials. There may be equal amount of Ru and Co. In other embodiments, there may be different concentrations of Ru and Co. However, both types of alloys are referred to herein as RuCo. In some embodiments, the additional material(s) added to RuCo to form the multi-phase layer may be selected from Mo, Nb, W, Al, Be, C, Dy, Gd, Ge, Ho, Lu, Nd, Pd, Sm, Tb, Y and Zr. The combination is an alloy that forms the majority and secondary phases described above for certain concentration ranges. The secondary phase formed in such RuCo layers is a eutectic phase. For example, if the multi-phase layer is a $(RuCo)_{100-w}X_w$ layer, where X is a material and w is a concentration, then X:w may be as follows: Al:0-30, Be:0-25, C:0-20, Dy:0-20, Gd:0-20, Ge:0-25, Ho:0-20, Lu:0-20, Mo:0-35, Nb:0-20, Nd:0-20, Pd:0-30, Sm:0-20, Tb:0-20, W:0-50, Y:0-20, Zr:0-20. Note that although zero concentrations are indicated above for the second constituents, there must be some of the material present. For example, if Al used, the concentration of Al is greater than zero and not more than thirty atomic percent. Such alloys include a first phase and a secondary eutectic phase having the properties described above.

Similarly, the multi-phase Ru-containing layer may include one or more layers in which Ru is alloyed with another material. In some embodiments, the additional material(s) may be selected from Mo, Nb, W, Al, Be, C, Dy, Gd, Ge, Ho, Lu, Nd, Pd, Sm, Tb, Y and Zr. The combination is a Ru alloy that forms the majority and secondary phases described above for certain concentration ranges. In some embodiments, the secondary phase formed is a eutectic phase. For example, the multi-phase Ru containing layer may be a Ru—Mo alloy that includes not more than thirty-five atomic percent Mo. In other embodiments, the Ru-containing layer may be a Ru—Nb alloy that includes not more than twenty atomic percent Nb. In still other embodiments, the multi-phase Ru-containing layer may be a Ru—W alloy that includes not more than fifty percent of W if the Ru-containing layer includes W. If Al, Be, C, Dy, Gd, Ho, Lu, Sm, Tb, Y, Zr are used, then the multi-phase alloy includes Ru and both greater than zero and not more than twenty atomic percent of Al, Be, C, Dy, Gd, Ho, Lu, Sm, Tb, Y, Zr. If Ge is used, then the multi-phase alloy includes Ru and both greater than zero and not more than twenty-five atomic percent of Ge. If Pd is used, then the multi-phase alloy includes Ru and both greater than zero and not more than thirty atomic percent of Pd.

Further, multiple Ru layers may be included. One or more of these Ru layers may be multi-phase alloys. In some embodiments, two Ru layers that are sputtered at different pressures may be included. For example, a first Ru alloy layer may be sputtered at a first pressure and a second Ru layer may be sputtered at a second pressure. The second pressure is greater than the first pressure. For example, the first layer may be a Ru alloy layer that is sputtered at less than twenty mTorr. In some such embodiments, the pressure is on the order of seven mTorr. The second layer may be a Ru alloy layer that is sputtered at greater than 60 mTorr and not more than 120 mTorr. For example, the pressure may be ninety mTorr. The intermediate layer(s) 160 may include multiple Ru alloy layers and a Ru—Co containing layer. Some combination of these Ru-containing layers may be a multi-phase layer.

The magnetic media 150 may have improved performance. The magnetic media 150 includes intermediate layer(s) 160 that has at least one multi-phase layer. In this multi-phase layer, the grain size and distribution may be controlled by the segregation of secondary (e.g. eutectic) phase to the grain boundaries. In other words, the grain size (measure of the diameter/length of the grain) may be smaller and the variation in grain size may be smaller. This reduction in grain size and distribution may be passed on to the magnetic recording stack 154. As a result, the coercive squareness, nucleation field, coercivity and thermal stability of the magnetic recording stack 154 may be improved. Noise may thus be reduced and signal-to-noise ratio enhanced.

Thus, performance of the magnetic recording media 150 at higher densities may be improved.

FIG. 4 depicts an exemplary embodiment of the magnetic media 150' usable in a disk drive such as the disk drive 100. For clarity, FIG. 4 is not to scale. The magnetic media 150' is analogous to the magnetic media 150 depicted in FIGS. 1-2. Thus, analogous components have similar labels. The magnetic media 150' includes a substrate 152, intermediate layer(s) and magnetic recording stack 154 are analogous to the substrate 152, intermediate layer(s) and magnetic recording stack 154 depicted in FIG. 2. In the embodiment shown, the substrate 152 may be AlMg. For simplicity not all portions of the magnetic recording media are shown. Other and/or additional layers may be present.

In addition to the substrate 152, intermediate layer(s) 160 and magnetic recording stack 154, optional adhesion layer(s) 155, antiferromagnetically coupled soft underlayer 156, orientation control layer 158 and overcoat layer 159 are shown. The overcoat layer 159 is on the magnetic recording stack 154 and between the magnetic recording stack 154 and the slider 110. The optional adhesion layer(s) 155 may include Cr, CrTa, and/or CrTi layers. Although not shown, Ta based seed layer(s), Ni—W, Ni—W—Al, and/or Ni—W—Al—Fe based seed layer(s) (not explicitly shown in FIG. 4) may also be included. The magnetic recording stack 154 is analogous to the magnetic recording stack 154 of FIG. 2 and stores magnetic data. The intermediate layer(s) 160 include one or more layers, at least one of which is a multi-phase layer. The multi-phase layer is an alloy layer having a majority phase and a secondary phase. The secondary phase has a diffusion constant higher than that of the majority phase. Thus, it is believed that the secondary phase segregates to the grain boundaries of the multi-phase layer. The majority phase has a crystal structure, an orientation, and a composition. The secondary phase is a precipitate that segregates out of the majority. The secondary phase may have a composition different from that of the majority phase. The crystal structure and orientation of the secondary phase may be different from or the same as that of the majority phase. The orientation and the crystal structure of the majority phase are substantially unchanged by the presence of the secondary phase.

The magnetic media 150' may have improved performance for similar reasons as the magnetic media 150. The intermediate layer(s) 160 have at least one multi-phase layer for which the grain size and distribution may be controlled by the segregation of secondary (e.g. eutectic) phase to the grain boundaries. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150' at higher densities may be improved.

FIG. 5 depicts an exemplary embodiment of the intermediate layer(s) 160' that may be usable in a magnetic media such as the media 150 and/or 150'. The intermediate layer(s) 160' are analogous to the intermediate layer(s) 160. For clarity, FIG. 5 is not to scale. The intermediate layer(s) 160' includes two Ru alloy layers 162 and 164. The layer 162 is a low pressure Ru layer. The layer 164 is a high pressure Ru layer that is also a multi-phase layer. The layer 162 is termed a low pressure layer because the layer 162 is formed at a lower pressure than the layer 164. For example, the low pressure layer 162 may be sputtered at less than twenty mTorr. In some such embodiments, the pressure is on the order of seven mTorr. The high pressure multi-phase Ru alloy layer 164 is on the low pressure Ru layer 162. Thus, layer 164 may adjoin the magnetic recording stack 154 and is between the magnetic recording stack 154 and the layer 162. The multi-phase high pressure Ru layer 164 is sputtered at greater than 60 mTorr and not more than 120 mTorr. For example, the pressure may be ninety mTorr.

The high pressure Ru alloy layer 164 is a multi-phase layer. Thus, the high pressure Ru alloy layer 164 includes a majority phase and a secondary phase. The characteristics of the majority and secondary phases are as discussed above. The secondary phase has a diffusion constant greater than the majority phase's diffusion constant. Thus, it is believed that the secondary phase precipitates out of the majority and segregates to the grain boundaries of the layer 164. The majority phase has a first crystal structure, a first orientation, and a first composition. The secondary phase may have a second composition different from the first composition of the majority phase. The crystal structure and orientation of the secondary phase may be different from or the same as that of the majority phase. The first orientation and the first crystal structure of the majority phase are substantially unchanged by the secondary phase. For example, the majority phase of the layer 164 may remain with a hexagonal close packed (HCP) crystal structure and the desired orientation despite the presence of the secondary phase. In some embodiments, this secondary phase is a eutectic phase.

In some embodiments, the layer 164 is formed by alloying Ru with additional materials. The additional material(s) added to Ru to form the multi-phase layer may be selected from Mo, Nb, W, Al, Be, C, Dy, Gd, Ge, Ho, Lu, Nd, Pd, Sm, Tb, Y and Zr. The combination is an alloy that forms the majority and secondary phases described above for certain concentration ranges. For example, if the multi-phase layer is a $(Ru)_{100-w}X_w$ layer, where X is a material and w is a concentration, then X:w may be as follows: Al:0-30, Be:0-25, C:0-20, Dy:0-20, Gd:0-20, Ge:0-25, Ho:0-20, Lu:0-20, Mo:0-35, Nb:0-20, Nd:0-20, Pd:0-30, Sm:0-20, Tb:0-20, W:0-50, Y:0-20, Zr:0-20. Note that in the concentrations above, a concentration of zero for the additional material indicates the presence of greater than zero atomic percent of the material. Such alloys include a first phase and a secondary eutectic phase having the properties described above.

The intermediate layer 160' may aid in improving the performance of the magnetic media 150 and/or 150'. The grain size and distribution may be controlled by the segregation of secondary (e.g. eutectic) phase to the grain boundaries in the layer 164. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150/150' at higher densities may be improved by the layer 160'.

Figure 6:
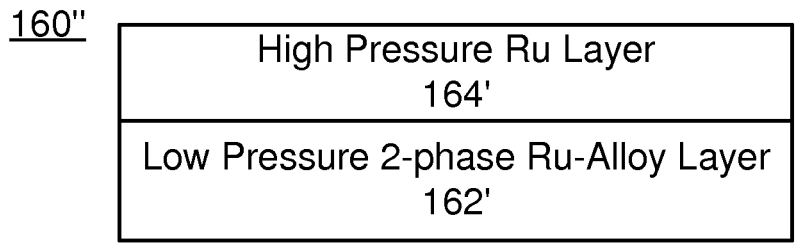
FIG. 6 depicts another exemplary embodiment of an intermediate layer for a magnetic recording media.

FIG. 6 depicts an exemplary embodiment of the intermediate layer(s) 160'' that may be usable in a magnetic media such as the media 150 and/or 150'. For clarity, FIG. 6 is not to scale. The intermediate layer(s) 160'' are analogous to the intermediate layer(s) 160 and/or 160'. The intermediate layer(s) 160' includes two Ru alloy layers 162' and 164'. The layer 162' is a low pressure Ru layer analogous to the layer 162. The layer 164' is a high pressure Ru layer that is analogous to the layer 164. The layer 162' is termed a low pressure layer because the layer 162' is formed at a lower pressure than the layer 164'. The pressures used for the layers 162' and 164' are analogous to those used for the layers 162 and 164, respectively.

In the intermediate layer(s) 160″, the high pressure layer 164' is a Ru layer while the low pressure layer 162' is a multi-phase layer. Thus, the low pressure Ru alloy layer 162' includes a majority phase and a secondary phase. The characteristics of the majority and secondary phases are as discussed above. The secondary phase has a diffusion constant greater than the majority phase's diffusion constant. Thus, it is believed that the secondary phase precipitates out of the majority and segregates to the grain boundaries of the low pressure layer 162'. The majority phase has a first crystal structure, a first orientation, and a first composition. The secondary phase may have a second composition different from the first composition of the majority phase. The crystal structure and orientation of the secondary phase may be different from or the same as that of the majority phase. The first orientation and the first crystal structure of the majority phase are substantially unchanged by the secondary phase. For example, the majority phase of the layer 162' may remain with a hexagonal close packed (HCP) crystal structure and the desired orientation despite the presence of the secondary phase. In some embodiments, this secondary phase is a eutectic phase.

In some embodiments, the layer 162' is formed by alloying Ru with additional materials. The additional material(s) added to Ru to form the multi-phase layer may be selected from Mo, Nb, W, Al, Be, C, Dy, Gd, Ge, Ho, Lu, Nd, Pd, Sm, Tb, Y and Zr. The combination is an alloy that forms the majority and secondary phases described above for certain concentration ranges. For example, if the multi-phase layer is a $(Ru)_{100-w}X_w$ layer, where X is a material and w is a concentration, then X:w may be as follows: Al:0-30, Be:0-25, C:0-20, Dy:0-20, Gd:0-20, Ge:0-25, Ho:0-20, Lu:0-20, Mo:0-35, Nb:0-20, Nd:0-20, Pd:0-30, Sm:0-20, Tb:0-20, W:0-50, Y:0-20, Zr:0-20. A concentration of 0 atomic percent for the additional material corresponds to a concentration of greater than zero atomic percent. Such alloys include a first phase and a secondary eutectic phase having the properties described above.

The intermediate layer 160″ may aid in improving the performance of the magnetic media 150 and/or 150'. The grain size and distribution may be controlled by the segregation of secondary (e.g. eutectic) phase to the grain boundaries in the layer 162'. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150/150' at higher densities may be improved by the layer 160″.

Figure 7:
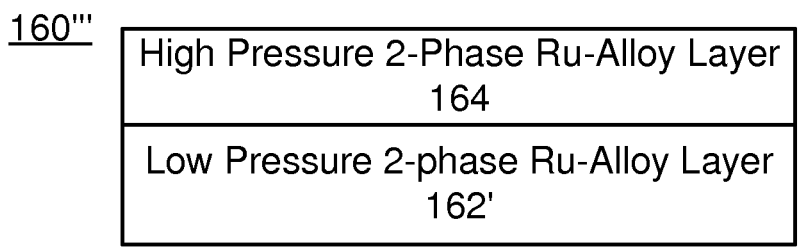
FIG. 7 depicts another exemplary embodiment of an intermediate layer for a magnetic recording media.

FIG. 7 depicts an exemplary embodiment of the intermediate layer(s) 160‴ that may be usable in a magnetic media such as the media 150 and/or 150'. For clarity, FIG. 7 is not to scale. The intermediate layer(s) 160‴ are analogous to the intermediate layer(s) 160, 160' and/or 160″. The intermediate layer(s) 160' includes two Ru alloy layers 162' and 164. The layer 162' is a low pressure Ru layer analogous to the layer 162/162'. The layer 164 is a high pressure Ru layer that is analogous to the layer 164'. The layer 162' is termed a low pressure layer because the layer 162' is formed at a lower pressure than the layer 164'. The pressures used for the layers 162' and 164' are analogous to those used for the layers 162 and 164, respectively.

The layers 162' and 164 are both multi-phase alloy layers. Thus, each of the layers 162' and 164 includes a majority phase and a secondary phase. The characteristics of the majority and secondary phases are as discussed above. The secondary phase has a diffusion constant greater than the majority phase's diffusion constant. Thus, it is believed that the secondary phase precipitates out of the majority and segregates to the grain boundaries of the layers 162' and 164. The majority phase has a first crystal structure, a first orientation, and a first composition. The secondary phase may have a second composition different from the first composition of the majority phase. The crystal structure and orientation of the secondary phase may be different from or the same as that of the majority phase. The first orientation and the first crystal structure of the majority phase are substantially unchanged by the secondary phase. For example, the majority phase of the layers 162' and 164 may remain with a hexagonal close packed (HCP) crystal structure and the desired orientation despite the presence of the secondary phase. In some embodiments, this secondary phase is a eutectic phase.

In some embodiments, the layers 162' and 164 are each formed by alloying Ru with additional materials. The additional material(s) added to Ru to form the multi-phase layer may be selected from Mo, Nb, W, Al, Be, C, Dy, Gd, Ge, Ho, Lu, Nd, Pd, Sm, Tb, Y and Zr. The combination is an alloy that forms the majority and secondary phases described above for certain concentration ranges. For example, if the multi-phase layer is a $(Ru)_{100-w}X_w$ layer, where X is a material and w is a concentration, then X:w may be as follows: Al:0-30, Be:0-25, C:0-20, Dy:0-20, Gd:0-20, Ge:0-25, Ho:0-20, Lu:0-20, Mo:0-35, Nb:0-20, Nd:0-20, Pd:0-30, Sm:0-20, Tb:0-20, W:0-50, Y:0-20, Zr:0-20. Note that a 0 atomic percent in the previous sentence indicates a concentration of greater than zero atomic percent for the additional material(s). Such alloys include a first phase and a secondary eutectic phase having the properties described above. Note that the compositions of the layers 162' and 164 may be the same or different. For example, layers 162' and 164 may be both Ru—Mo layers. In another embodiment, the layer 162' may be a Ru—W layer while the layer 164 is a Ru—Mo layer.

The intermediate layer 160‴ may aid in improving the performance of the magnetic media 150 and/or 150'. The grain size and distribution may be controlled by the segregation of secondary (e.g. eutectic) phase to the grain boundaries in the layers 162' and 164. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150/150' at higher densities may be improved by the layer 160‴.

Figure 8:
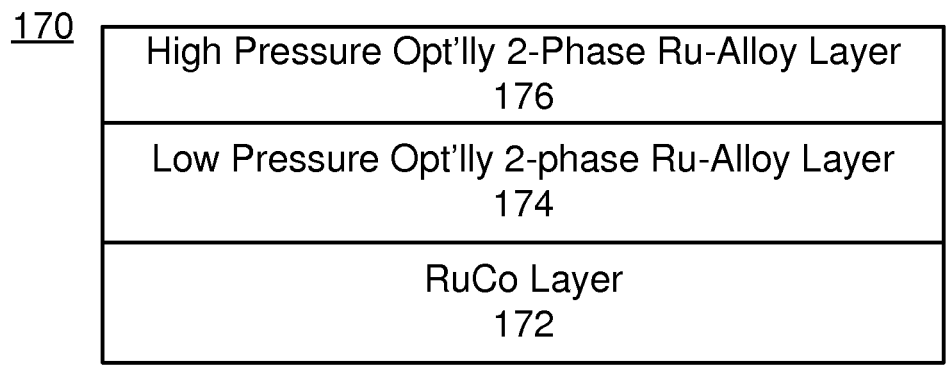
FIG. 8 depicts another exemplary embodiment of an intermediate layer for a magnetic recording media.

FIG. 8 depicts an exemplary embodiment of the intermediate layer(s) 170 that may be usable in a magnetic media such as the media 150 and/or 150'. For clarity, FIG. 8 is not to scale. The intermediate layer(s) 170 are analogous to the intermediate layer(s) 160, 160', 160″ and/or 160‴. The intermediate layer(s) 170 includes a RuCo layer 172 and two Ru-containing layers 174 and 176. In some embodiments, the RuCo layer 172 is at least two nanometers thick and not more than twelve nanometers thick. In some such embodiments, the RuCo layer 172 is at least five nanometers thick and not more than eight nanometers thick. The RuCo layer 172 is an alloy. The layers 174 and 176 include Ru. At least one of the layers 174 and 176 is a multi-phase layer. Thus, the layers 174 and 176 are labeled as "optionally two phase Ru-alloy layer" because one or both of the layers 174 and 176 may have two phases. In some embodiments, only the layer 174 has two phases and would thus be analogous to the layers 162'. In other embodiments, only the layer 176 has two phases. In such embodiments, the layer 176 is analogous to the layer 164. In other embodiments, both layers 174 and 165 have two phases and may thus be analogous to the layers 162' and 164, respectively. The layer 174 is a low pressure Ru layer analogous to the layer 162 or 162'. In some embodiments, the low pressure Ru layer 174 may be at least one nanometer thick and not more than ten nanometers thick. The low pressure Ru layer 174 may be at least two nanometers thick and not more than six nanometers thick. The structure and composition of the layer 174 is analogous to the layer 162 or 162'. The layer 176 is a high pressure Ru layer that is analogous to the layer 164 or 164'. In some embodiments, the high pressure Ru layer 176 is at least four nanometers thick and not more than twelve nanometers thick. In some such embodiments, the high pressure Ru layer 176 is at least six nanometers thick and not more than ten nanometers thick. The structure and composition of the layer 176 is analogous to the layer 164 or 164'. In one embodiment, the intermediate layer(s) 170 include a RuCo alloy layer 172, a low pressure Ru layer 174 analogous to the layer 162, and a high pressure multi-phase layer 176 analogous to the layer 164. In another embodiment, the intermediate layer(s) 170 include a RuCo alloy layer 172, a low pressure multi-phase Ru layer 174 analogous to the layer 162', and a high pressure layer 176 analogous to the layer 164'. In another embodiment, the intermediate layer(s) 170 include a RuCo alloy layer 172, a low pressure multi-phase Ru layer 174 analogous to the layer 162', and a high pressure multi-phase layer 176 analogous to the layer 164. Thus, one or both of the layers 174 and 176 includes a majority phase and a secondary phase. The characteristics of the majority and secondary phases are as discussed above.

The intermediate layer 170 may aid in improving the performance of the magnetic media 150 and/or 150'. The grain size and distribution may be controlled by the segregation of secondary (e.g. eutectic) phase to the grain boundaries in the layers 174 and/or 176. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150/150' at higher densities may be improved by the layer 170.

Figure 9:
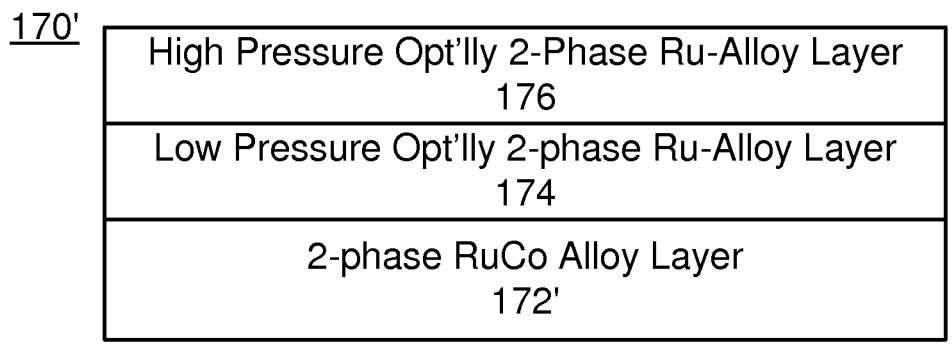
FIG. 9 depicts another exemplary embodiment of an intermediate layer for a magnetic recording media.

FIG. 9 depicts an exemplary embodiment of the intermediate layer(s) 170' that may be usable in a magnetic media such as the media 150 and/or 150'. For clarity, FIG. 9 is not to scale. The intermediate layer(s) 170' are analogous to the intermediate layer(s) 160, 160', 160" and/or 160'". The intermediate layer(s) 170' includes a multi-phase RuCo layer 172' and two Ru-containing layers 174 and 176. The layers 174 and 176 include Ru. At least one of the layers 174 and 176 is a multi-phase layer. Thus, the layers 174 and 176 are labeled as "optionally two phase Ru-alloy layer" because one or both of the layers 174 and 176 may have two phases. In some embodiments, only the layer 174 has two phases and would thus be analogous to the layers 162'. In other embodiments, only the layer 176 has two phases. In such embodiments, the layer 176 is analogous to the layer 164. In other embodiments, both layers 174 and 165 have two phases and may thus be analogous to the layers 162' and 164, respectively. The layer 174 is a low pressure Ru layer analogous to the layer 162 or 162'. The structure and composition of the layer 174 is analogous to the layer 162 or 162'. The layer 176 is a high pressure Ru layer that is analogous to the layer 164 or 164'. The structure and composition of the layer 176 is analogous to the layer 164 or 164'. In some embodiments, the low pressure Ru layer 174 may be at least one nanometer thick and not more than ten nanometers thick. The low pressure Ru layer 174 may be at least two nanometers thick and not more than six nanometers thick. In some embodiments, the high pressure Ru layer 176 is at least four nanometers thick and not more than twelve nanometers thick. The high pressure Ru layer 176 may be at least six nanometers thick and not more than ten nanometers thick.

The RuCo layer 172' includes RuCo alloyed with at least a second material. In some embodiments, the RuCo layer 172' is at least two nanometers thick and not more than twelve nanometers thick. In some embodiments, the RuCo layer 172' is at least five nanometers thick and not more than eight nanometers thick. Thus, the RuCo layer 172' includes a majority phase and a secondary phase. The characteristics of the majority and secondary phases are as discussed above. In some embodiments, the additional material(s) added to RuCo to form the multi-phase layer may be selected from Mo, Nb, W, Al, Be, C, Dy, Gd, Ge, Ho, Lu, Nd, Pd, Sm, Tb, Y and Zr. The combination is an alloy that forms the majority and secondary phases described above for certain concentration ranges. The secondary phase formed in such RuCo layers is a eutectic phase. For example, if the multi-phase layer is a $(RuCo)_{100-w}X_w$ layer, where X is a material and w is a concentration, then X:w may be as follows: Al:0-30, Be:0-25, C:0-20, Dy:0-20, Gd:0-20, Ge:0-25, Ho:0-20, Lu:0-20, Mo:0-35, Nb:0-20, Nd:0-20, Pd:0-30, Sm:0-20, Tb:0-20, W:0-50, Y:0-20, Zr:0-20. Note that although zero concentrations are indicated above for the second constituents, there must be some of the material present. Such an alloys include a first, majority phase and a secondary eutectic phase having the properties described above.

In one embodiment, the intermediate layer(s) 170' include a multi-phase RuCo alloy layer 172', a low pressure Ru layer 174 analogous to the layer 162, and a high pressure multi-phase layer 176 analogous to the layer 164. In another embodiment, the intermediate layer(s) 170' include a multi-phase RuCo alloy layer 172', a low pressure multi-phase Ru layer 174 analogous to the layer 162', and a high pressure layer 176 analogous to the layer 164'. In another embodiment, the intermediate layer(s) 170' include a multi-phase RuCo alloy layer 172', a low pressure multi-phase Ru layer 174 analogous to the layer 162', and a high pressure multi-phase layer 176 analogous to the layer 164. Thus, the RuCo layer 172' and one or both of the layers 174 and 176 includes a majority phase and a secondary phase. The characteristics of the majority and secondary phases are as discussed above.

The intermediate layer 170' may aid in improving the performance of the magnetic media 150 and/or 150'. The grain size and distribution may be controlled by the segregation of secondary (e.g. eutectic) phase to the grain boundaries in the layers 172' and one or both of the layers 174 and 176. Thus, the grain size may be smaller and the variation in grain size may be reduced. This reduction in grain size and distribution may be passed on to the magnetic recording stack 154. As a result, noise may thus be reduced and signal-to-noise ratio enhanced. Thus, performance of the magnetic recording media 150/150' at higher densities may be improved by the layer 170'.

Figure 10:
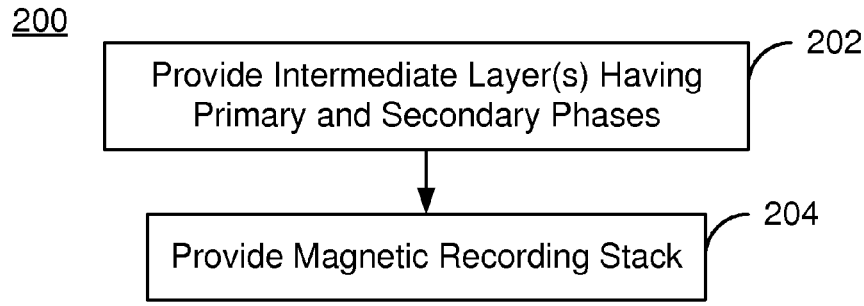
FIG. 10 is a flow chart depicting an exemplary embodiment of a method for providing magnetic recording media usable in a magnetic recording apparatus.

FIG. 10 depicts an exemplary embodiment of a method 200 for providing a magnetic recording media such as the media 150. For simplicity, some steps may be omitted, interleaved, and/or combined. The method 200 is also described in the context of providing a magnetic recording disk drive 100 and media 150 depicted in FIGS. 1-2. However, the method 200 may be used to fabricate multiple magnetic recording disks at substantially the same time. The method 200 may also be used to fabricate other magnetic recording media. The method 200 is also described in the context of particular layers. A particular layer may include multiple materials and/or multiple sub-layers. The method 200 also may start after formation of other portions of the magnetic recording media.

Referring to FIGS. 1-2 and 4, the intermediate layer 160 is provided on the substrate, via step 202. Step 202 may include depositing providing one or more multi-phase layers. For example, the layer 160', 160", 160''', 160'', 170 and/or 170' may be provided in step 202. This may include sputtering, plating, chemical vapor depositing, or otherwise depositing the materials to form the multi-phase layer. Step 202 may also include formation of single phase layers. For example, the layer 160' which has one multi-phase layer 162 and one single phase layer 164 may be fabricated using step 202.

The magnetic recording stack 154 is provided on the intermediate layer(s) 160, via step 204. Step 204 may include depositing multiple layers such as exchange coupling or exchange breaking layer(s). Fabrication of the media 150/150' may then be completed.

Using the method 200, the magnetic disk drive 100 and magnetic recording media 150/150' may be provided. Thus, the benefits of the magnetic recording media 150/150' and magnetic recording transducer 120 may be achieved.

Figure 11:
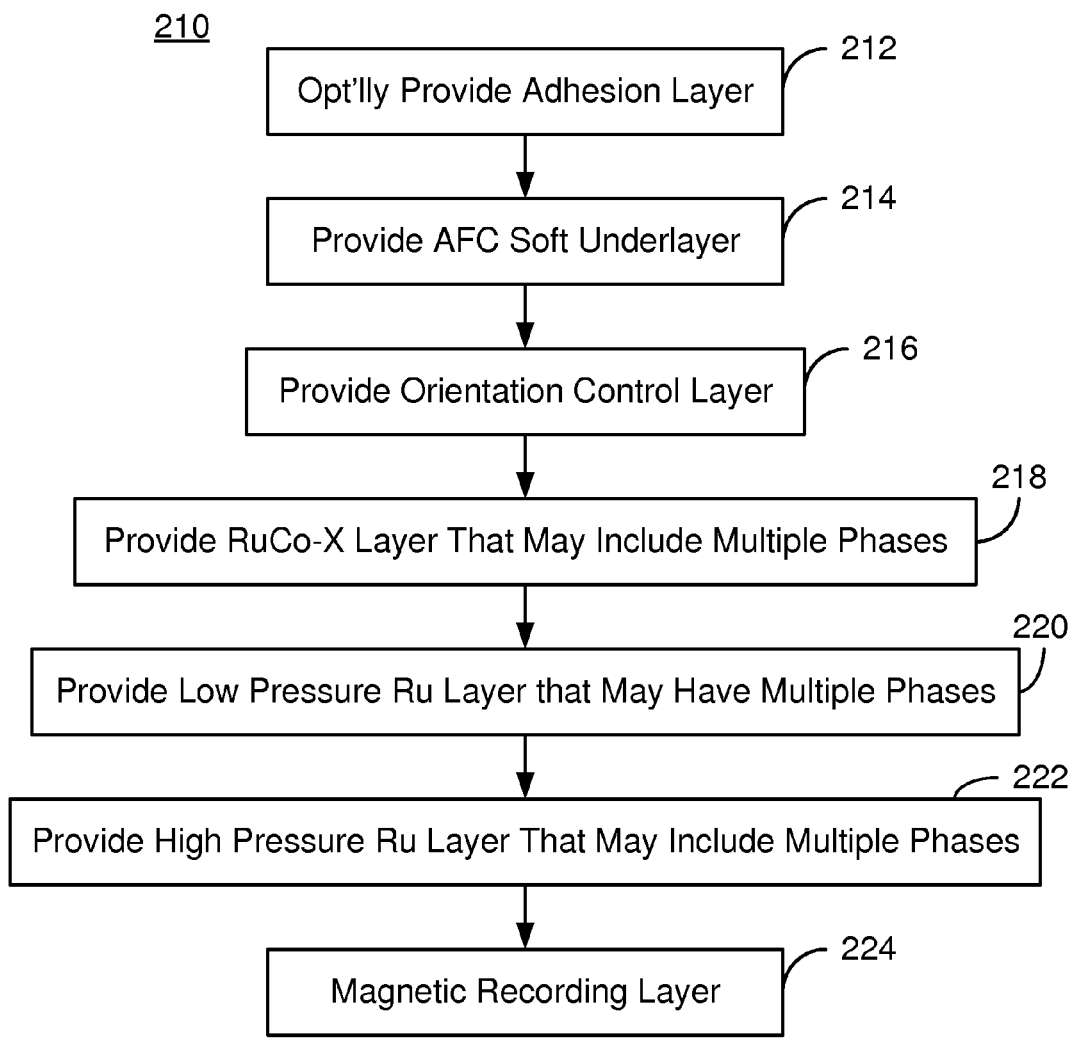
FIG. 11 depicts a flow chart of another exemplary embodiment of a method for fabricating a magnetic recording media usable in a disk drive.

FIG. 11 depicts an exemplary embodiment of a method 210 for providing a magnetic recording media such as the media 150'. For simplicity, some steps may be omitted, interleaved, and/or combined. The method 210 is also described in the context of providing a disk drive 100 and media 150' depicted in FIGS. 1 and 4. However, the method 210 may be used to fabricate multiple magnetic recording heads at substantially the same time. The method 210 may also be used to fabricate other magnetic recording media. The method 210 is also described in the context of particular layers. A particular layer may include multiple materials and/or multiple sub-layers. The method 210 also may start after formation of other portions of the magnetic recording media 150'.

Referring to FIGS. 1, 4 and 11, the adhesion layer(s) 155 and antiferromagnetically coupled soft underlayer 156 are optionally provided on the substrate 152 via steps 212 and 214, respectively. The optional orientation control layer 158 is deposited, via step 216. The RuCo layer 172/172' may be provided in step 218. Step 218 may include providing a multi-phase RuCo layer. Alternatively, a single phase RuCo layer may be formed in step 218. A low pressure Ru layer is deposited in step 220. Step 220 may include forming a single phase or a multi-phase layer. Step 220 includes a low pressure sputter deposition of the material(s) for the layer 174/174'. A high pressure Ru layer is deposited in step 222. Step 222 may include forming a single phase or a multi-phase layer. Step 222 includes a high pressure sputter deposition of the material(s) for the layer 176/176'.

The magnetic recording layer 154 may be deposited, via step 224. Step 222 may include depositing multiple magnetic layers. Fabrication of the magnetic recording media 150/150' may then be completed. For example, the overcoat layer 159 may also be provided after step 222.

Using the method 210, the magnetic disk drive 100 and magnetic recording media 150/150' may be provided. Thus, the benefits of the magnetic recording media 150' and disk drive 100 may be achieved.

We claim:

1. A magnetic recording media usable in a magnetic storage device, the magnetic recording media comprising:
   a substrate;
   at least one intermediate layer with a majority phase having a first diffusion constant and a secondary phase having a second diffusion constant greater than the first diffusion constant, the at least one intermediate layer including a first intermediate layer, a second intermediate layer and a third intermediate layer, the second intermediate layer being between the first intermediate layer and the third intermediate layer, each of the first intermediate layer, the second intermediate layer and the third intermediate layer including Ru, at least one of the second intermediate layer and the third intermediate layer having the majority phase and the secondary phase, the first intermediate layer including Ru and Co, wherein the first intermediate layer further includes at least one of Mo, Nb, W, Al, Be, C, Dy, Gd, Ge, Ho, Lu, Nd, Pd, Sm, Tb, Y or Zr; and
   a magnetic recording stack for storing magnetic data, the magnetic recording stack residing on the third intermediate layer such that the at least one intermediate layer is between the substrate and the magnetic recording stack.

2. The magnetic recording media of claim 1 wherein the secondary phase is a eutectic phase.

3. The magnetic recording media of claim 1 wherein the majority phase has a first crystal structure, a first orientation, and a first composition, the secondary phase being a precipitate having a second composition different from the first composition, the first orientation and the first crystal structure being substantially unchanged by the secondary phase.

4. The magnetic recording media of claim 1 wherein a compositional percentage of Ru in the first intermediate layer is at most 80%.

5. The magnetic recording media of claim 1 wherein the second intermediate layer is sputtered at a first sputtering pressure and the third intermediate layer is sputtered at a second sputtering pressure, the second sputtering pressure being greater than the first sputtering pressure.

6. The magnetic recording media of claim 1 wherein the second intermediate layer further includes at least one of Mo, Nb, W, Al, Be, C, Dy, Gd, Ge, Ho, Lu, Nd, Pd, Sm, Tb, Y and Zr and wherein the third intermediate layer includes at least one of Mo, Nb, W, Al, Be, C, Dy, Gd, Ge, Ho, Lu, Nd, Pd, Sm, Tb, Y and Zr.

7. The magnetic recording media of claim 1 wherein at least one of the second intermediate layer and the third intermediate layer also includes an additional material selected from Mo, Nb, W, Al, Be, C, Dy, Gd, Ge, Ho, Lu, Nd, Pd, Sm, Tb, Y and Zr.

8. The magnetic recording media of claim 7 wherein at least one of the second intermediate layer and the third intermediate layer includes not more than thirty atomic percent Mo if the additional material is Mo, wherein the at least one of the second intermediate layer and the third intermediate layer includes not more than twenty atomic percent Nb if the additional material is Nb, and wherein the at least one of the second intermediate layer and the third intermediate layer includes not more than 50 of W if the at least one of the second intermediate layer and the third intermediate layer includes W.

9. The magnetic recording media of claim 8 wherein at least one of the second intermediate layer and the third intermediate layer includes W.

10. The magnetic recording media of claim 1 wherein at least one of the first intermediate layer and the second intermediate layer has a plurality of grains with a plurality of grain boundaries, the secondary phase segregating to the plurality of grain boundaries.

11. The magnetic recording media of claim 1 further comprising:
   a soft underlayer on the substrate;
   an orientation control layer on the soft underlayer, the orientation control layer being between the soft underlayer and the at least one intermediate layer.

12. A magnetic recording media usable in a magnetic storage device, the magnetic recording media comprising:
   a substrate;
   a first intermediate layer on the substrate, the first intermediate layer including Ru, Co and at least a first additional element, the first additional element including at least one of Mo, Nb and W in a first concentration such that the first intermediate layer has a primary RuCo phase and a first eutectic phase having a first diffusion constant greater than a RuCo diffusion constant;
   a second intermediate layer on the first intermediate layer, the second intermediate layer including Ru and at least a second additional element including at least one of Mo, Nb and W in a second concentration such that the second intermediate layer has a primary Ru phase and a second eutectic phase having a second diffusion constant greater than a Ru diffusion constant;
   a third intermediate layer on the second intermediate layer, the third intermediate layer including the Ru and at least a third additional element including at least one of Mo, Nb and W in a third concentration such that the third intermediate layer has the primary Ru phase and a third eutectic phase having a third diffusion constant greater than the Ru diffusion constant; and
   a magnetic recording stack for storing magnetic data, the magnetic recording stack residing on the third intermediate layer.

13. A magnetic recording disk drive comprising:
   a media including a substrate, at least one intermediate layer on the substrate and a magnetic recording stack on the at least one intermediate layer, the at least one intermediate layer with a majority phase having a first diffusion constant and a secondary phase having a second diffusion constant greater than the first diffusion constant, the at least one intermediate layer including a first intermediate layer, a second intermediate layer and a third intermediate layer, the second intermediate layer being between the first intermediate layer and the third intermediate layer, each of the first intermediate layer, the second intermediate layer and the third intermediate layer including Ru, at least one of the second intermediate layer and the third intermediate layer having the majority phase and the secondary phase, the first intermediate layer including Ru and Co, wherein the first intermediate layer further includes at least one of Mo, Nb, W, Al, Be, C, Dy, Gd, Ge, Ho, Lu, Nd, Pd, Sm, Tb, Y or Zr; and
   a slider including a write transducer, the transducer having air-bearing surface (ABS), a main pole and at least one coil, the main pole being configured to write to a region of the media.

14. A method for magnetic recording media usable in a magnetic storage device, the method comprising:
   providing at least one intermediate layer on a substrate, the at least one intermediate layer including a majority phase having a first diffusion constant and a secondary phase having a second diffusion constant greater than the first diffusion constant, a magnetic recording stack residing on the intermediate layer, the step of providing the at least one intermediate layer further including
      providing a first intermediate layer including Ru and Co;
      providing a second intermediate layer including Ru; and
      providing a third intermediate layer including Ru, the second intermediate layer being between the first intermediate layer and the third intermediate layer, at least one of the second intermediate layer and the third intermediate layer having the majority phase and the secondary phase; and
   providing a magnetic recording stack on the at least one intermediate layer, the magnetic recording stack for storing magnetic data, wherein the second intermediate layer is sputtered at a first sputtering pressure and the third intermediate layer is sputtered at a second sputtering pressure, the second sputtering pressure being greater than the first sputtering pressure.

15. The method of claim 14 wherein the secondary phase is a eutectic phase.

16. The method of claim 14 wherein the majority phase has a first crystal structure, a first orientation, and a first composition, the secondary phase being a precipitate having a second composition different from the first composition, the first orientation and the first crystal structure being substantially unchanged by a presence of the secondary phase.

17. The method of claim 14 wherein the first intermediate layer consists of Ru and Co.

18. The method of claim 14 wherein at least one of the second intermediate layer and the third intermediate layer includes an additional material selected from Mo, Nb, W, Al, Be, C, Dy, Gd, Ge, Ho, Lu, Nd, Pd, Sm, Tb, Y and Zr.

19. The method of claim 14 further comprising:
   providing a soft underlayer on the substrate;
   providing an orientation control layer on the soft underlayer, the orientation control layer being between the soft underlayer and the at least one intermediate layer.

* * * * *